United States Patent [19]
Burdess

[11] Patent Number: 5,490,420
[45] Date of Patent: Feb. 13, 1996

[54] GYROSCOPIC DEVICES

[75] Inventor: James S. Burdess, Whitley Bay, England

[73] Assignee: British Technology Group Ltd., London, England

[21] Appl. No.: 142,357

[22] PCT Filed: May 22, 1992

[86] PCT No.: PCT/GB92/00930

§ 371 Date: May 6, 1994

§ 102(e) Date: May 6, 1994

[87] PCT Pub. No.: WO92/21000

PCT Pub. Date: Nov. 26, 1992

[30] Foreign Application Priority Data

May 24, 1991 [GB] United Kingdom .................. 9111316

[51] Int. Cl.$^6$ ..................................................... G01P 9/04
[52] U.S. Cl. ....................................................... 73/504.02
[58] Field of Search ............................. 73/504, 505, 510, 73/577 R, 577 AV

[56] References Cited

U.S. PATENT DOCUMENTS

| | | | |
|---|---|---|---|
| 4,524,619 | 6/1985 | Staudte | 73/505 |
| 4,538,461 | 9/1985 | Juptner et al. | 73/505 |
| 4,654,663 | 3/1987 | Alsenz et al. | 73/505 |
| 4,699,006 | 10/1987 | Boxenhorn | 73/577 AV |
| 4,967,605 | 11/1990 | Okada | 73/577 R |
| 5,060,039 | 10/1991 | Weinberg | 73/577 R |
| 5,121,180 | 6/1992 | Beringhause et al. | 73/577 AV |
| 5,203,208 | 4/1993 | Bernstein | 73/505 |
| 5,275,047 | 1/1994 | Zabler et al. | 73/505 |

FOREIGN PATENT DOCUMENTS

| | | |
|---|---|---|
| 0060185 | 9/1982 | European Pat. Off. . |
| 2561389 | 3/1985 | France . |
| 2156523 | 10/1985 | United Kingdom . |
| 2198231 | 6/1988 | United Kingdom . |
| 2215053 | 9/1989 | United Kingdom . |
| 2249174 | 4/1992 | United Kingdom . |
| 2251688 | 7/1992 | United Kingdom . |
| WO880350 | 1/1988 | WIPO . |

OTHER PUBLICATIONS

Patent Abstracts of Japan, vol. 8, No. 163 (P–290) [1600], 27 Jul. 1984 & JP, A, 59060210 (Nihon Koukuu Denshi Kogyo K.K.) 6 Apr. 1984, see the whole document.

Primary Examiner—Hezron E. Williams
Assistant Examiner—Helen C. Kwok
Attorney, Agent, or Firm—Cushman, Darby & Cushman

[57] ABSTRACT

A gyroscopic device comprising a supporting structure (2; 104) and at least one mass (1; 50, 51; 100–103), the masses being attached to the structure by beams (3–6; 25–28; 52–63; 98–99). Masses, supporting structure and beams lie within a common plane when the device is at rest. A voltage source (V) to generates electromotive forces between such masses and structures to excite the masses into a vibratory primary motion. By simple flexure the beams can permit the masses to make limited motion relative to the structure in response to a rate of turn applied to the device, a measure of that rate being obtained from sensing that relative motion. By appropriate arrangement of the flexural connections (85–88) between the mass and the supporting structure, the device can measure rates of turn about two orthogonal axes. By connecting the supporting structure (104) to further structure (112) with additional flexural members (113) the device may be made capable of measuring rates of turn about three orthogonal axes.

9 Claims, 6 Drawing Sheets

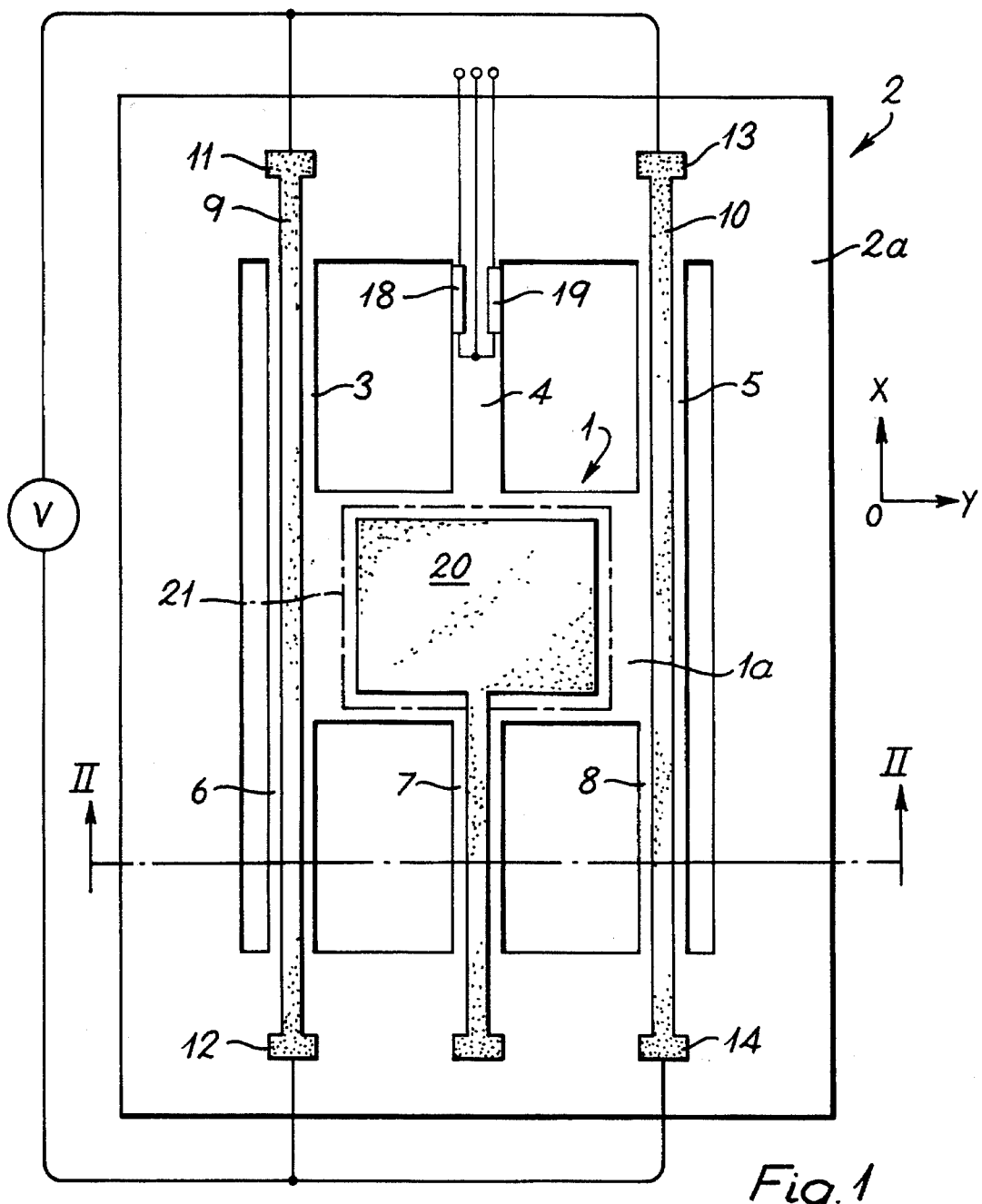
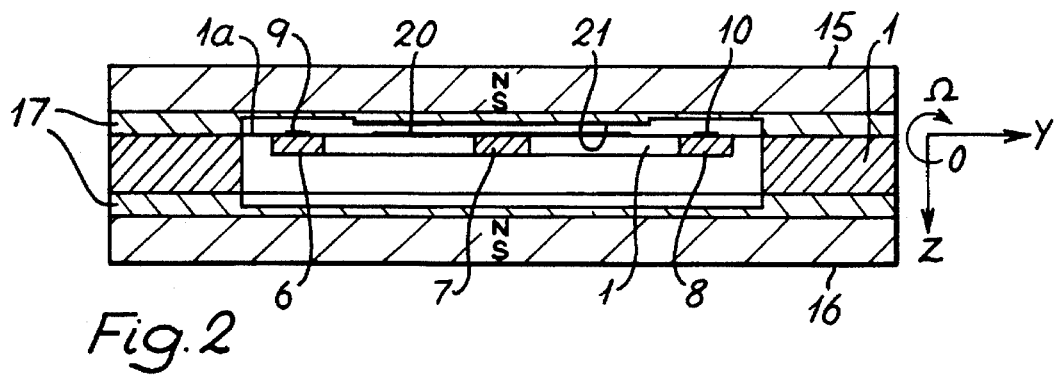
Fig.1
Fig.2

5,490,420

GYROSCOPIC DEVICES

This application claims the benefit of international application PCT/GB92/00930 filed May 22, 1992, which designated the United States.

FIELD OF THE INVENTION

This inventions relates to gyroscopic devices, capable of providing a measure of a rate of turn about one and possibly further axes. It relates in particular to solid-state devices of simple construction, containing no gimballed or otherwise rotating parts, in which the primary motion of a mass relative to a supporting structure is one of vibration, and in which the relative motions between the different parts of the device, in response both to that primary motion and to all consequent motions, involve primarily the bending or flexure of suitable components.

DESCRIPTION OF RELATED ART

The present invention is thus to be distinguished particularly from the type of device of which examples are described in published patent specification GB-A-2198231, in which the necessary relative movements between the mass and its supporting structure include a degree of tilting, whereby corresponding surfaces of the mass and structure, which are coplanar when the device is at rest, come to lie in intersecting planes instead. This requires the connecting filaments to be subjected to a substantial degree of twist, as well as to flexure.

Examples of devices where the movement of the connecting members between masses and supporting structures is more purely flexural in character are described, for instance, in published patent specifications U.S. Pat. No. A-4524619, U.S. Pat. No. A-4538461, and GB-A-2156523. In all of these examples, however, the forces that set the mass into its primary vibration are transmitted to it mechanically, through solid links connecting the mass to its supporting structure. The links must therefore be robust enough to transmit such forces.

SUMMARY OF THE INVENTION

The present invention arises, in part, from appreciating that the forces can be transmitted in a manner which by-passes any such mechanical links. The invention arises also from appreciating that the simplicity of the construction of the Kind of solid-state devices referred to in the previous paragraph particularly lends itself to the use of miniature monolithic planar silicon components. The basic structure of each gyroscope may be made out of many materials including glass and plastics, but typically It will be produced from silicon, and the detect,on and drive functions will be added by using techniques such as photolithography, chemical etching, ion beam machining and thin film deposition. These techniques are already well known, and are currently available for the manufacture of miniature components from materials such as crystalline silicon and polysilicon.

BRIEF DESCRIPTION OF THE DRAWINGS

The invention is defined by the claims, the contents of which are to be read as included within the disclosure of this specification, and embodiments of the invention will now be described by way of example with reference to the accompanying simplified and diagrammatic drawings in which:

FIG. 1 is a plan view of part of one embodiment;

FIG. 2 is a section through that embodiment on the line II—II in FIG. 1;

DESCRIPTION OF PREFERRED EMBODIMENTS

Figure 3:
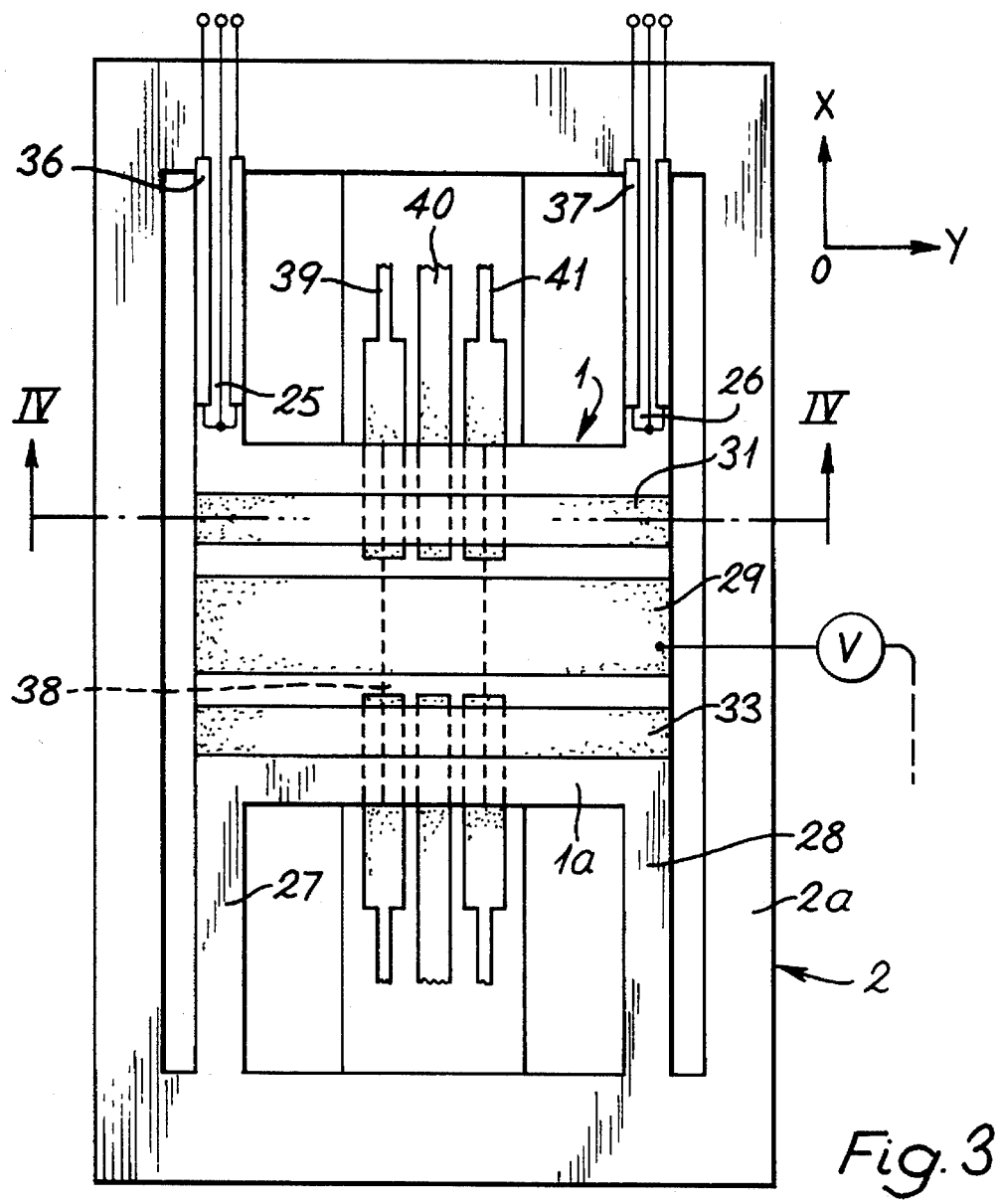
FIG. 3 is a plan view of part of a second embodiment.

In FIG. 1 a seismic mass, by which we mean a generally flat mass that responds to vibration and can be used to detect it, is denoted by reference 1 and lies, when at rest, with its flat surface 1a in a plane OXY. It is attached to a supporting structure 2, the flat surface 2a of which also lies in plane OXY, by means of six parallel and identical beams 3–8. The beams are designed to be transversely flexible, so permitting the mass 1 to move in the directions OY and OZ, i.e. perpendicular to the beams which lie parallel to OX. Deposited onto the topmost surface of the gyroscope are two identical and parallel conducting strips 9 and 10. Strip 9 extends from a pad 11, deposited on structure 2, along the tops of beams 3, mass 1 and beam 6 to another pad 12 on structure 2. Strip 10 runs from a pad 13 on structure 2, along the tops of beam 5, mass 1 and beam 8 to a further pad 14 on structure 2. When pads 11 and 13, 12 and 14 are connected in parallel to an alternating voltage source V, identical currents will flow through the strips 9 and 10. If the parts shown in FIG. 1 are now placed within a permanent magnetic field directed along the axis OZ, by being sandwiched between magnets 15 and 16 and cover plates 17 as shown in FIG. 2, so that the lines of magnetic flux lie parallel to OZ, forces proportional to the current in strips 9 and 10 will be produced at the strips, and will cause the mass 1 to be displaced in the direction OY. The alternating voltage produced by source V will thus generate alternating forces that cause mass 1 to vibrate in the direction OY, and if the frequency of the current is chosen to coincide with the natural frequency of free vibration of the mass 1 on its supporting beams 3–8, then large amplitudes of vibration along OY can be achieved for small values of current. The magnitude of this response can be detected and measured by many suitable kinds of strain gauges. In the example of FIG. 1 they are piezo-resistive strain gauges 18 and 19, deposited on or attached to the root of beam 4. These gauges measure the strain in beam 4 due to the displacement of mass 1 along axis OY. If the voltage applied across pads 11, 13; 12, 14 is derived from the output of these gauges, using a feedback loop (not shown), then by using well-known techniques mass 1 can be caused to execute a sustained vibration parallel to OY at its natural frequency and at a pre-set amplitude. This vibratory motion of mass 1 is the primary motion of the gyroscopic device.

When the device is subjected to a rate of turn about axis OX, Coriolis inertia forces are generated due to the dynamic coupling between that rate of turn and the primary motion, and these cause the mass 1 to be deflected parallel to axis OZ, so that surface 1a moves out of, but remains parallel at all times to, plane OXY. This deflection provides the output of the device, and is measured by means of a capacitor formed by an electrode 20 deposited on the mass 1 and an electrode 21 deposited on one of the cover plates 17. The gap between electrodes 20 and 21 can by modern technology be micromachined to the order of microns, and the deflection of mass 1 along OZ changes this gap and thereby the capacitance. This change, provided the deflection is small in comparison with the gap, is proportional to the deflection itself and can therefore be used to provide an electrical measurement of the applied rate of turn.

It is possible to replace strips 9 and 10 by doping the corresponding regions of mass 1, structure 2 and beams 3, 6; 5, 8 so that the material of those components, typically silicon, becomes locally conductive.

It should be noted in particular that in operation of the embodiment just described by way of example, the beams 3–8 do not act as mechanical linkages by which forces are transmitted from the fixed structure 2 to the mass 1, so as to cause that mass to execute its primary motion. Instead, the beams flex only in response to that primary motion, which is caused by the non-contacting and electromagnetic interaction of components fixed to the mass and to the supporting structure respectively.

Figure 4:
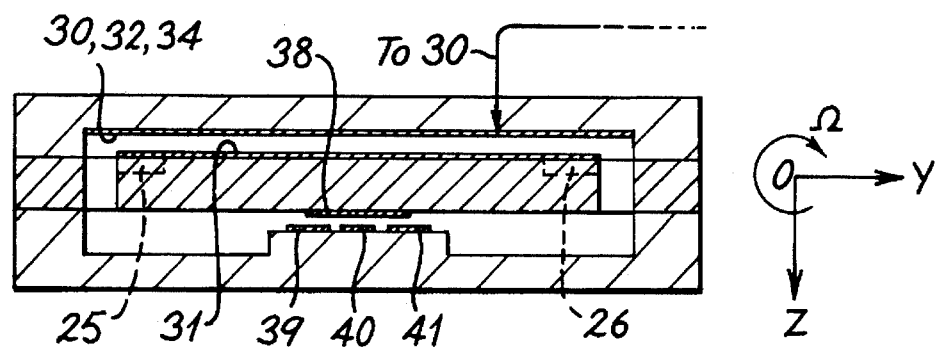
FIG. 4 is a section through that embodiment on the line IV—IV in FIG. 3.

In the embodiment of FIGS. 3 and 4, only four beams 25–28 connect the mass 1 to the supporting structure 2. Electrodes 29 and 30 form an electrostatic actuator, and by applying an alternating voltage across them from source V the mass 1 is caused to execute the primary motion of the device by vibrating in the direction OZ. In the manner described in relation to the embodiment of FIGS. 1 and 2, this vibration can be detected and controlled by capacitive action by means of additional electrode pairs 31, 32 and 33, 34 deposited on the surfaces of the mass 1 and supporting structure 2. When a rate of turn is applied about axis OX, Coriolis effects cause the mass 1 to vibrate in the direction OY. The amplitude of this vibration is a measure of the applied rate and is detected by pairs of piezo-resistive strain gauges 36 and 37 deposited on beams 25 and 26. These gauges respond to the bending strains in the beams 25 and 26 caused by the displacement of mass 1 along OY. Again the planes of flat surfaces 1a, 2a remain coincident or parallel at all times.

An alternative method of measuring the response to an input rate is also shown in FIG. 4. An electrode 38 is attached to the bottom surface of the mass 1 and is positioned so that it is symmetrically placed about the longitudinal axis OX. This electrode is electrically unconnected to its surroundings and is therefore allowed to take up its own electrical potential. Deposited onto the supporting structure and positioned directly below electrode 38 are three independent electrodes 39, 40 and 41. These are arranged to be symmetrically positioned about the central axis OX and form a differential capacitance network with electrode 38. When the mass 1 is displaced along OY, due to an input rate of turn about axis OX, the network registers a change in capacitance and this can be processed, by well-known means, to provide a measure of the rate of turn.

Figure 5:
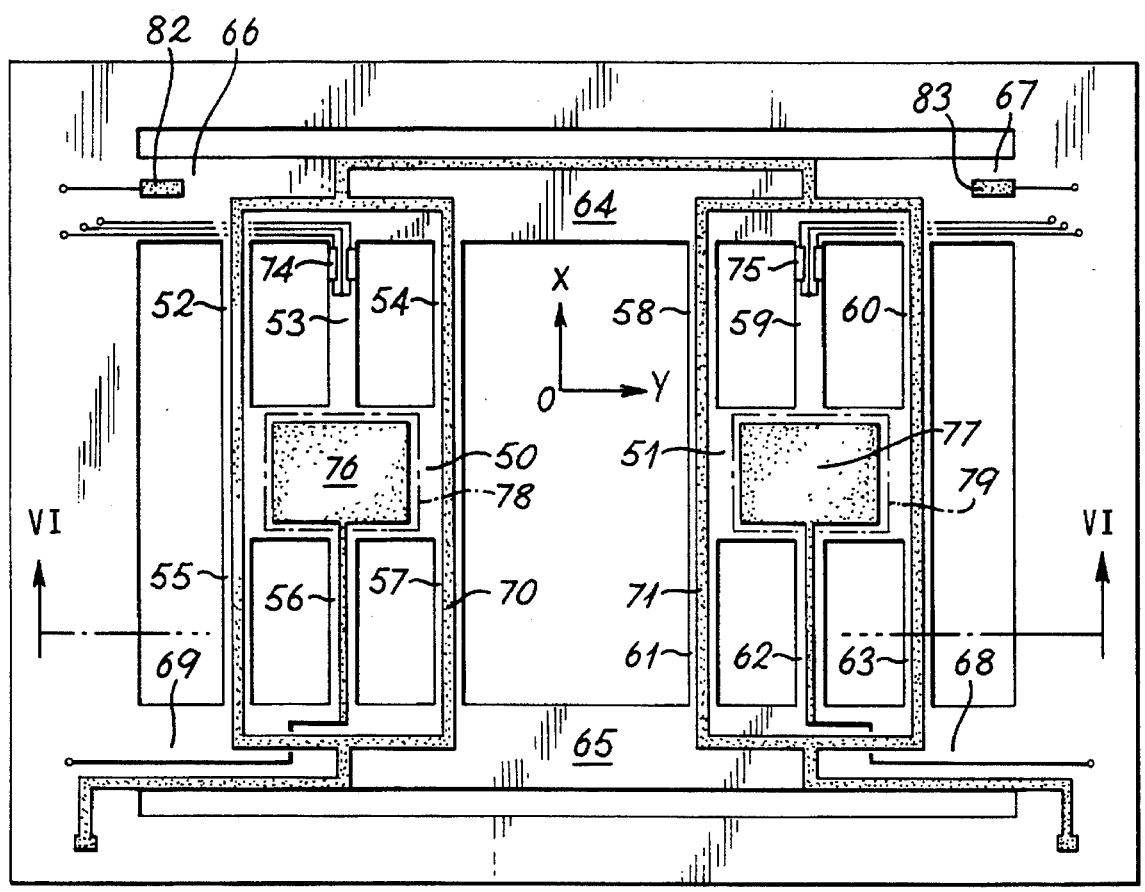
FIG. 5 is a plan view of part of a third embodiment including two seismic masses.

If multiple masses are arranged to form a balanced oscillation, force reactions at the supporting structure, in response to the primary motion of the seismic mass, can be reduced. FIG. 5 shows a possible arrangement. Identical masses 50 and 51, each similar to the mass 1 of FIGS. 1 to 4, are connected to a supporting structure 2 by means of beams 52–57 and 58–63 respectively. These beams are transversely flexible along axis OX and this allows the masses freedom of motion along axis OY.

The connection between these beams and the supporting structure 2 is achieved through a framework which consists of end plates 64 and 65—designed to be as rigid as possible—and further beams 66–69, these beams having a thin cross section so that they are flexible In bending along axis OY. This flexibility allows the assembly of the masses 50, 51 and their supporting linkage of beams to rotate about OX.

Identical electrical currents are passed through conducting strips 70 and 71 deposited onto the beam systems 52–57 and 58–63. These strips are connected together so that the current in 70 flows in the opposite direction to the current in 71.

Figure 6:
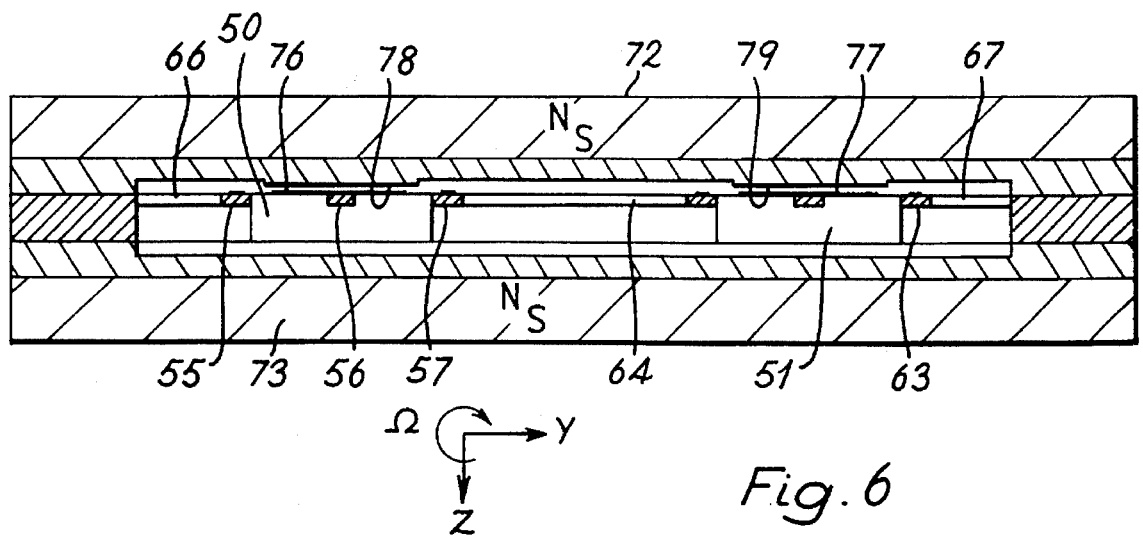
FIG. 6 is a section through that embodiment on the line VI—VI in FIG. 5.

When the assembly so described is placed in a magnetic field, having a direction parallel to axis OZ and set up by magnets 72, 73 shown in FIG. 6, then periodically varying currents give rise to forces which cause the masses 50 and 51 to vibrate in antiphase along axis OY with equal amplitude. This motion, which constitutes the primary motion of the gyroscope, causes no resultant force to be transmitted to the supporting structure 2 and the gyroscope is said to be dynamically balanced. The primary motion is measured and controlled by means of piezo-resistive gauges 74 and 75 deposited onto the center beams 53 and 59. A gauge arrangement essentially similar to that described for FIG. 1 may be employed.

When a rate of turn is applied about axis OX, Coriolis inertia forces are applied to masses 50 and 51 and a secondary motion along OZ occurs. Since the primary motions of the two masses are in antiphase it follows that the secondary motion can be detected by means of the capacitors formed between masses 50 and 51 and the supporting structure 2 by electrodes 76 and 77 on the masses, and corresponding electrodes 78 and 79 mounted on a cover plate 80 shown in FIG. 6. As the masses are displaced along OZ the capacitance of these capacitors changes, as in FIG. 1, and this change is measured and used to generate a measure of the applied rate.

An alternative method of measurement is to deposit piezo-resistive gauges 82 and 83 on the thin beams 66 and 67. The Coriolis inertia forces applied to masses 50 and 51 will cause these beams, and the corresponding beams 69 and 68 at the other end of the device, to be deflected In bending. This bending can be measured by the strain gauges and used to generate a measure of applied rate.

By suitable design of the seismic masses and their supporting beams, it is possible to arrange for the natural frequency of their primary motion to be matched to the natural frequency of the whole assembly vibrating in the mode corresponding to the secondary motion. The sensitivity of the gyroscope can be enhanced by making these frequencies coincident.

Figure 7:
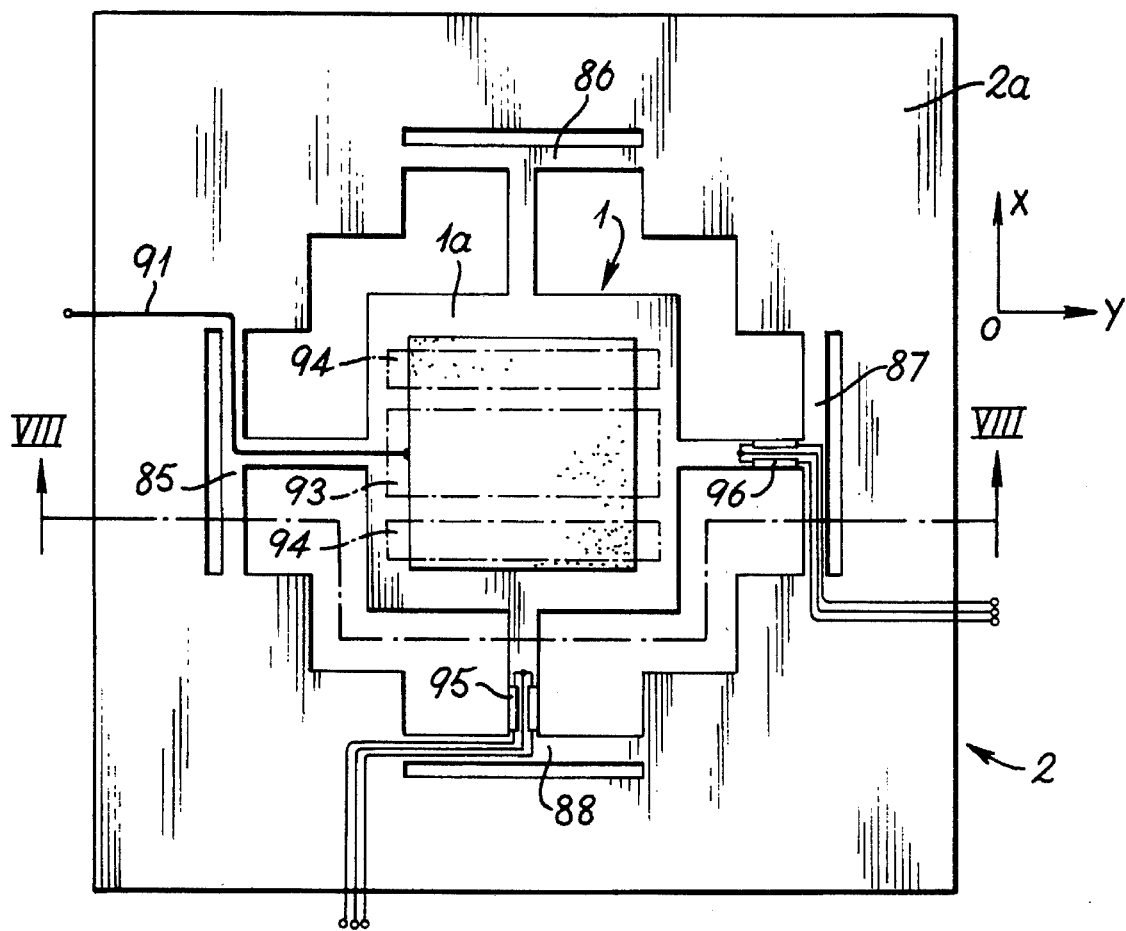
FIG. 7 is a plan view of part of a fourth embodiment, capable of responding to rotation about two axes.
Figure 8:
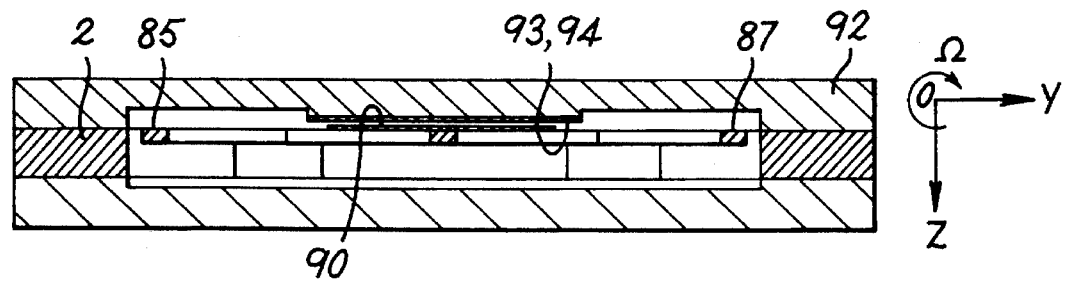
FIG. 8 is a section through that embodiment on the line VIII—VIII in FIG. 7.

A two axis rate gyroscope is shown in FIG. 7 and 8. Here the mass 1 is connected to the supporting frame 2 by means of four sets of 'T' shaped flexural springs 85–88. The springs are attached to the mass at the mid points of their sides and are positioned so that their respective axes of symmetry are aligned with either the OX or OY axes of the gyroscope, that is to say the springs form a 90 degree rotational symmetry about OZ. The two ends of the head of each 'T'-shaped spring are rigidly connected to the supporting frame 2.

Flexure of the stem of springs 86 and 88 in the direction of OY permits the seismic mass to be displaced along OY and flexure of the heads of the same springs permits a corresponding displacement along OX. Further, since the breadth and depth of each beam cross section are designed to be of similar proportions the 'T' assembly is also capable of allowing, by flexure, a displacement of the mass 1 along OZ. The four 'T' pieces therefore form a complete elastic suspension system for the mass and permit the center of the mass 1 to be independently displaced in any of the three directions OX, OY and OZ, but so that the planes of the flat surfaces 1a, 2a of mass and support are parallel at all times.

An electrode 90 is deposited onto the upper surface of the mass 1 and is held at earth potential through a conductive track 91. This electrode is simultaneously used to excite and measure the primary motion of the mass, which is arranged to take place in the direction of OZ. Immediately above electrode 90 and connected to the supporting frame 2 by means of a top plate 92 are excitation and detection electrodes 93 and 94. By applying an alternating voltage to electrode 93 the mass can be forced, by electrostatic action, to vibrate along OZ. Its displacement along OZ can be detected and controlled by measuring the change in capacitance of the capacitor formed by electrodes 90 and 94.

When a rate of turn is applied about, say, axis OX then the mass is caused to vibrate in the direction of axis OY. This motion is proportional to the applied rate and causes bending of the stems of springs 86, 88 in the direction of OY. The bending is detected by means of piezo-resistive strain gauges 95 deposited on spring 88. These gauges are electrically connected so that their output is insensitive to displacements of the mass 1 along OX and OZ. For an applied rate about axis OY a corresponding bending displacement occurs in the stems of springs 85 and 87 and this is detected by the output generated by piezo-resistive gauges 96 on spring 87.

Figure 9:
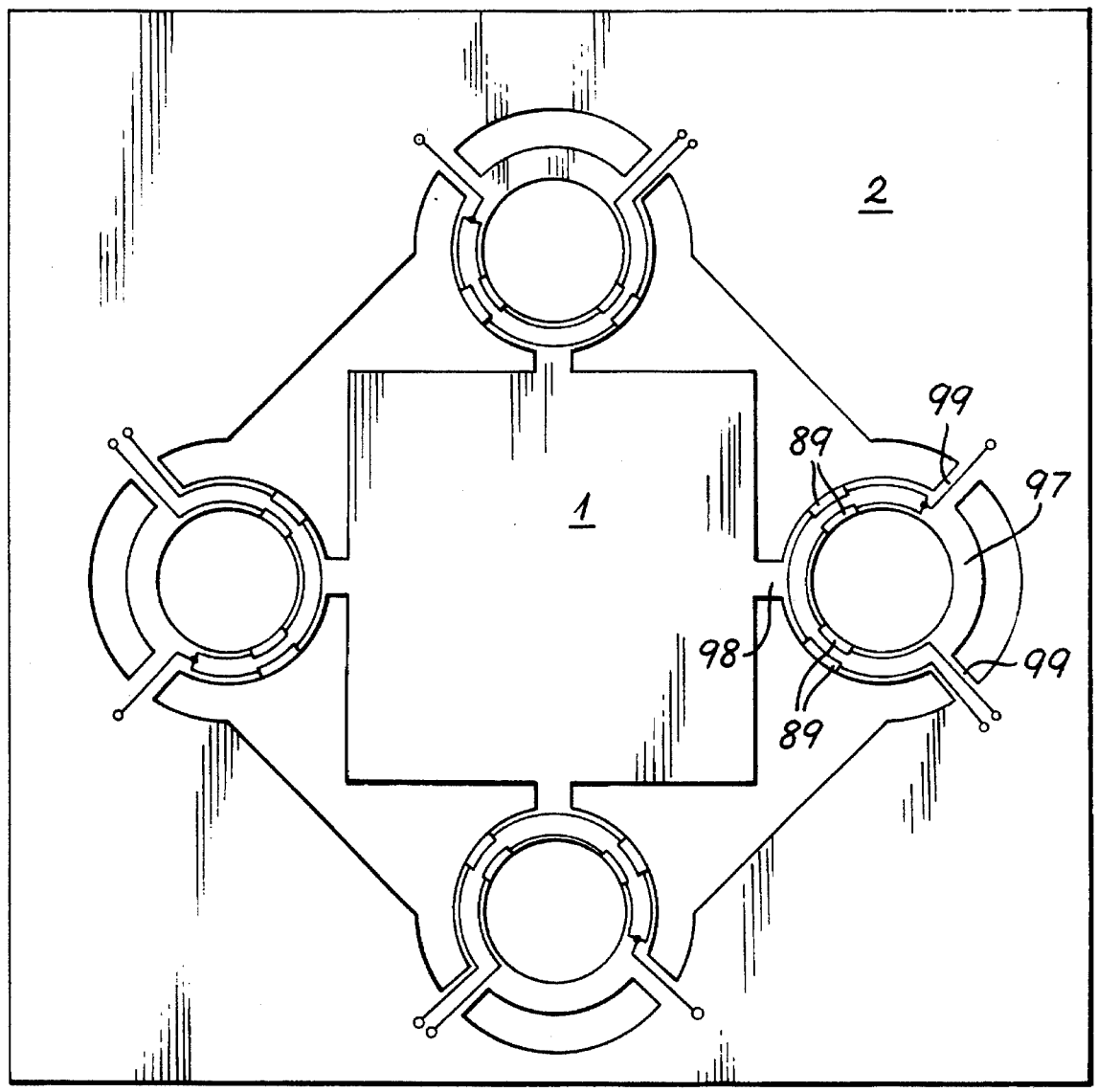
FIG. 9 is a simplified plan view of part of an alternative to the arrangements of supporting beams shown in FIG. 7.

The form of the flexural spring defined by the stems and heads of items 85–88 is not unique. The principal purpose of the spring is to allow the connection point between the spring and the seismic mass to have three degrees of freedom, i.e. to be capable of independent motion along axis OX, OY and OZ. In the alternative mounting shown in FIG. 9, the mass 1 is again supported from the structure 2 by four sets of flexural springs, as in FIG. 7, but the springs are of different configuration. Each of the four sets comprises a ring 97 from which three arms extend radially outwards. One of these arms, 98, connects the ring 97 to the mass 1. The other two arms 99 are arranged symmetrically relative to arm 98, and connect the ring 97 to the structure 2. A total of sixteen piezo-resistive strain gauges 89, four of such gauges being mounted in appropriate geometry and electrical circuitry on each ring 97, can between them respond to displacements of mass 1 along both OX and axes.

Figure 10:
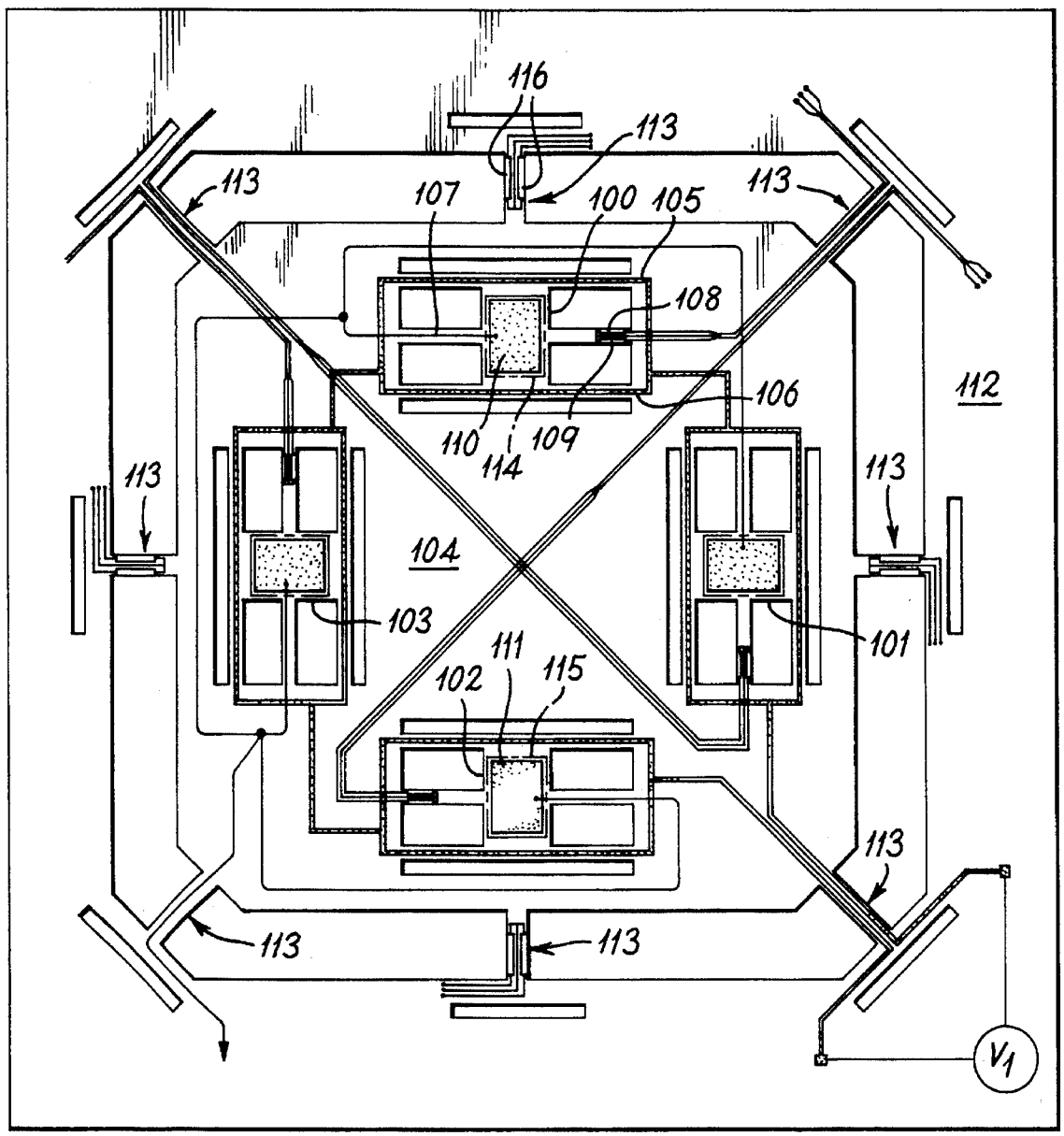
FIG. 10 is a plan view of part of a fifth embodiment, capable of sensing rotation about three axes.

It is possible to combine the foregoing designs to produce compound arrangements which will function as a three-axis sensor, as shown in FIG. 10. Four identical seismic masses 100–103 are connected to a supporting structure 104 by means of the beam network shown and are so positioned that the assembly has a 90° rotational symmetry about the normal, OZ, axis. Structure 104 is in turn supported from a further and fixed structure 112 by 'T'-shaped flexible springs 113, similar to items 85–88 in FIG. 7. The masses and their supporting beams are all similar in form to the arrangement shown In FIG. 1. The inner and outer beams of each mass carry conducting strips 105–107. Strips 105 and 106 are connected across an alternating voltage source $V_1$ and strip 107 is held at earth potential. As in FIG. 1 the whole assembly is placed in a magnetic field in which the lines of magnetic flux are perpendicular to the plane of the sensor. An alternating current flowing in strips 105 and 106 will cause each mass to vibrate in the OXY plane in a direction which is perpendicular to the magnetic field and the flow of current. The amplitude of vibration of each mass Is measured by piezo-resistive strain gauges—such as 108–109—deposited onto the "center" beam of its supportive beam network. As in FIG. 1 these gauges measure the strain in the beam and are preferably positioned near the root region of each center beam. By making the drive voltage proportional to these strain gauge signals the masses can be made to vibrate so that the 90° rotational symmetry of the assembly is maintained at all times during the motion. For this situation the masses move radially from the center of the device in phase and the assembly operates as a balanced oscillator.

Rates of turn about axes OX and OY are detected by measuring the displacement of the masses 100–103 along axis OZ. For example consider a rate of turn about OY. This rate is measured by determining the displacement, along OZ, of masses 100 and 102. A pair of capacitors formed by earthed electrodes 110 and 111 on the two masses, and electrodes 114 and 115 on the fixed support 112, perform this measurement. For displacement of masses 100 and 102 along OZ the separation between electrodes 110 and 114 and the separation between electrodes 111 and 115 changes and the change of capacitance is a measure of the applied rate. If the gap between 110 and 114 increases then the gap between 111 and 115 will decrease and the sensing electronics must be designed to take this into account.

A similar configuration of electrodes is used with masses 101 and 103 to detect rates of turn about OX.

For a rate of turn about axis OZ the motion of the supporting structure 104 is measured. Since masses 100–103 move in phase and have equal primary displacements, a rate of turn about OZ causes an oscillatory inertia torque to be generated about OZ proportional to the rate of turn. This torque is applied, via the masses, to the structure 104. Since structure 104 is attached to the further and fixed structure 112 by a number of identical, elastic units 113, this torque will cause the structure 104 to rotate about OZ. This rotation Is measured by piezo-resistive strain gauges 116 deposited onto the stems of units 113, and the resulting strain signal Is taken as a measure of the applied rate about OZ. As in other embodiments already described, the planes of the flat surfaces of the masses 100–103, the supporting structure 104 and the fixed and further structure 112 remain parallel at all times. It should also be specially noted that one consequence of such relative motion of the masses, and the supporting and further structures, is that the various connecting beams (e.g. items 3–8, 25–28, 52–63, 85–88, 98–99, and 113) used in the described embodiments are subjected to no substantial twist, but only essentially to bending or flexure.

In an arrangement as shown in FIG. 10 it is not possible to deposit the conducting strips 105–107, the electrodes 110 and 111 and the piezo-resistive gauges 108, 109 and 116 onto a single surface since the connecting tracks must physically overlap. It is therefore necessary to build up these connections on insulating layers which are successively deposited onto the upper surface of the unit. For example suppose the tracks 105 and 106 are deposited first. To provide isolation an insulating layer is then deposited onto the whole upper surface. Onto this layer the earthed track 107 and the earthed electrode sets, such as 110 and 111, are deposited. A second insulating layer is then deposited. The piezo-resistive gauges, such as 108 and 109, could then be deposited and protected by the deposition of a third insulating layer. The piezo-resistive gauges 116 could then be deposited onto this final layer.

I claim:

1. A gyroscopic device comprising:

at least one mass having a first flat surface;

a supporting structure having a second flat surface and encompassing said at least one mass;

a plurality of beams attaching said at least one mass to said supporting structure, said plurality of beams lying within a common plane when said device is at rest, each of said plurality of beams being of elongated shape in a lengthwise direction, said plurality of beams being disposed about said at least one mass such that said first flat surface of said at least one mass is maintained parallel to said common plane and parallel to said second flat surface of said supporting structure at all times; and electromotive power generating means within the gyroscopic device for generating electromotive forces between said at least one mass and said supporting structure to excite said at least one mass into a vibratory primary motion, said primary motion of said at least one mass flexing said plurality of beams in a manner including torsionless bending in said lengthwise direction permitting said it least one mass to make a limited secondary motion in response to a rate of turn of said device, a measure of said rate of turn being obtained from sensing a relative movement between said at least one mass and said supporting structure.

2. A gyroscopic device according to claim 1, further comprising:

a sensor sensing a deflection of at least one of said plurality of beams to obtain said measure of said rate of turn.

3. A gyroscopic device according to claim 1, further comprising:

a plurality of sensors mounted on said at least one mass and said supporting structure, respectively, said plurality of sensors sensing said relative movement between said at least one mass and said supporting structure.

4. A gyroscopic device according to claim 1, wherein:

said at least one mass includes a first mass and a second mass;

said first mass and said second mass are arranged in said gyroscopic device such that when said first mass and said second mass are excited into respective primary vibration, a first force generated by said first mass is substantially equal to and opposite from a second force generated by said second mass.

5. A gyroscopic device according to claim 1, wherein:

said plurality of beams are arranged symmetrically with respect to a pair of orthogonal axes lying within said common plane.

6. A gyroscopic device according to claim 5, further comprising:

a further supporting structure supporting said supporting structure in a manner analogous to that in which said at least one mass is supported from said supporting structure; and said gyroscopic device providing said measure of rate of turn as a relative movement between said supporting structure and said further supporting structure.

7. A gyroscopic device according to claim 1, wherein:

said electromotive power generating means generates said electromotive forces electromagnetically.

8. A gyroscopic device according to claim 7, wherein:

said electromotive power generating means generates said electromagnetically generated electromotive forces by a non-contacting interaction between said at least one mass and said supporting structure.

9. A gyroscopic device according to claim 6, wherein:

said further supporting structure presents a third flat surface, a relative movement between said supporting structure and said further supporting structure being such that said first flat surface of said at least one mass, said second flat surface of said supporting structure, and said third flat surface of said further supporting structure all remain parallel at all times.

* * * * *